(12) United States Patent
Wang

(10) Patent No.: US 9,055,551 B2
(45) Date of Patent: Jun. 9, 2015

(54) PREFIX ALLOCATION METHOD, NETWORK SYSTEM, AND LOCAL MOBILITY ANCHOR

(75) Inventor: Yungui Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 166 days.

(21) Appl. No.: 13/198,496

(22) Filed: Aug. 4, 2011

(65) Prior Publication Data

US 2011/0292879 A1 Dec. 1, 2011

Related U.S. Application Data

(63) Continuation of application No. PCT/CN2010/071237, filed on Mar. 24, 2010.

(30) Foreign Application Priority Data

Mar. 26, 2009 (CN) .......................... 2009 1 0119782

(51) Int. Cl.
*H04W 36/14* (2009.01)
*H04W 80/04* (2009.01)
(Continued)

(52) U.S. Cl.
CPC .............. *H04W 60/005* (2013.01); *H04W 8/26* (2013.01); *H04W 36/14* (2013.01); *H04W 80/04* (2013.01); *H04W 88/06* (2013.01)

(58) Field of Classification Search
CPC ..... H04W 60/005; H04W 8/26; H04W 36/14; H04W 80/04; H04W 88/06
USPC ......................................... 370/328, 329, 310
See application file for complete search history.

(56) References Cited

U.S. PATENT DOCUMENTS 7,149,225 B2 * 12/2006 Thubert et al. ................. 370/401
7,843,843 B1 * 11/2010 Papp et al. ..................... 370/252
(Continued)

FOREIGN PATENT DOCUMENTS

CN          1794737 A      6/2006
CN       101123575 A      2/2008
(Continued)

OTHER PUBLICATIONS

WO2009152669. Zhu et al., "Method for realizing netowrk switching and system and mobile node". Dec. 23, 2009.*
(Continued)

*Primary Examiner* — Alpus H Hsu
*Assistant Examiner* — Anthony Luo
(74) *Attorney, Agent, or Firm* — Brinks Gilson & Lione

(57) ABSTRACT

The present disclosure relates to the mobile communication field and discloses a prefix allocation method, a network system, and a Local Mobility Anchor (LMA). With the prefix allocation method, the network system and the LMA provided in the present disclosure, the problem that a shared prefix cannot be allocated to a multi-interface (IF) Mobile Node (MN) is solved. The prefix allocation method includes: receiving a registration request for a second IF of the MN from a Mobile Access Gateway (MAG); obtaining a first Home Network Prefix (HNP) that is already allocated to a first interface (IF) of the MN; and allocating the first HNP shared with the first IF to the second IF. The LMA obtains the first HNP that is already allocated to the first IF and allocates the first HNP to the second IF. In this way, a shared prefix is allocated to the multi-IF enabled MN.

5 Claims, 8 Drawing Sheets

(51) Int. Cl.
*H04W 88/06* (2009.01)
*H04W 60/00* (2009.01)
*H04W 8/26* (2009.01)

(56) References Cited

U.S. PATENT DOCUMENTS

| | | | |
|---|---|---|---|
| 8,385,249 B2* | 2/2013 | Sarikaya | 370/312 |
| 8,599,843 B2* | 12/2013 | Sarikaya | 370/389 |
| 2007/0189219 A1* | 8/2007 | Navali et al. | 370/331 |
| 2010/0189037 A1* | 7/2010 | Lee et al. | 370/328 |
| 2010/0303031 A1* | 12/2010 | Rune | 370/329 |
| 2011/0026435 A1* | 2/2011 | Weniger et al. | 370/254 |
| 2011/0103340 A1* | 5/2011 | Zhu et al. | 370/329 |
| 2011/0216680 A1* | 9/2011 | Vogt et al. | 370/310 |

FOREIGN PATENT DOCUMENTS

| | | |
|---|---|---|
| CN | 101212397 A | 7/2008 |
| CN | 101237394 A | 8/2008 |
| CN | 101330453 A | 12/2008 |
| CN | 101394333 A | 3/2009 |
| WO | WO 2008/126357 A1 | 10/2008 |

OTHER PUBLICATIONS

Office Action issued in corresponding Chinese Patent Application No. 200910119782.X, mailed Oct. 8, 2012.
Written Opinion of the International Searching Authority issued in corresponding PCT Patent Application No. PCT/CN2010/071237, mailed Jul. 1, 2010.
Extended European Search Report issued in corresponding European Patent Application No. 10755430.5, mailed Nov. 28, 2011.
Cui et al., "Simultaneous Multi-Access for PMIPv6 Based on Single HNP Model" NETEXT Working Group, Oct. 18, 2009.
Devarapalli et al., "Multiple Interface Support with Proxy Mobile IPv6" NETEXT Working Group, Mar. 3, 2009.
Jeyatharan et al., "Multiple Interfaced Mobile Nodes in NetLMM" NetLMM Working Group, Oct. 29, 2008.
Jeyatharan et al., "Multihoming Problem Statement in NetLMM" NetExt Working Group, Mar. 9, 2009.
NTT DoCoMo, NEC, Fujitsu, "Response to NetLMM Application for Inter Access System Mobility" 3.5. 3GPP TSG SA WG2 Architecture—S2#SAEAdHoc, Paris, France, Apr. 3-6, 2006. XP-002462416.
Office Action issued in corresponding European Patent Application No. 10755430.5, mailed May 24, 2013, 5 pages.
Office Action issued in corresponding Chinese Patent Application No. 200910119782.X, mailed May 10, 2013, 9 pages.
Narten, T. et al "Neighbor Discovery for IP Version 6 (IPv6)." Network Working Group. Sep. 2007.
Gundavelli, S. et al. "Proxy Mobile IPv6." Network Working Group. Aug. 2008.
Yokota, H. "Inter-Technology Handoff Support in Mobile Node for Proxy Mobile IPv6 draft-yokota-netlmm-pmipv6-mn-itho-support-00.txt" Network Working Group. Aug. 22, 2008.
International Search Report issued in corresponding PCT Application No. PCT/CN2010/071237; mailed Jul. 1, 2010.

* cited by examiner

| Type | Length | S | Reserved | Prefix length |

| HNP |

| Type | Code | Checksum |
| S | Reserved | |
| Options ... | | |

| Type | Code | Checksum |
|------|------|----------|
| Identifier | | S | Reserved |
| Options... | | | |

FIG. 5b

| Type | Length | Prefix length | L | A | R | Reserved 1 |
|------|--------|---------------|---|---|---|------------|
| valid lifetime | | | | | | |
| Preferred lifetime | | | | | | |
| Reserved 2 | | | | | | |
| Prefix | | | | | | |

FIG. 6

PREFIX ALLOCATION METHOD, NETWORK SYSTEM, AND LOCAL MOBILITY ANCHOR

CROSS-REFERENCE TO RELATED APPLICATIONS

This application is a continuation of International Application No. PCT/CN2010/071237, filed on Mar. 24, 2010, which claims priority to Chinese Patent Application No. 200910119782.X, filed on Mar. 26, 2009, both of which are hereby incorporated by reference in their entireties.

FIELD

The present disclosure relates to the mobile communication field, and in particular, to a prefix allocation method, a network system, and a Local Mobility Anchor (LMA).

BACKGROUND

Proxy Mobile IP (PMIP) is widely applied on the Worldwide Interoperability for Microwave Access (WiMAX) network, 3rd Generation Partnership Project (3GPP) System Architecture Evolution (SAE) network, and network systems for interworking between the 3GPP network and the WiMAX network. Generally, as shown in FIG. 1, the basic architecture of a PMIPV6 system includes:

An Authentication, Authorization and Accounting (AAA) server, which provides access authentication and authorization for the MN to access the network. Generally, on the 3GPP SAE network, the AAA server coexists with a Home Subscriber Server (HSS) that stores the subscription information of the MN. If the AAA server is separate from the HSS, the AAA server may communicate with the HSS to obtain the subscription information of the MN.

A Mobile Node, MN and a Correspondent Node, CN, being a pair of communication nodes in a point-to-point service application, and the communication nodes are corresponding to a network device such as a terminal or a server.

A Mobile Access Gateway (MAG) and a Local Mobile Anchor (LMA) are the basic network elements in the PMIPv6 system and are generally located on the gateway of access network and the gateway of core network respectively.

The basic mechanism of the PMIPv6 system is as follows: after the MN attaches to the network where the MAG is located, the MAG completes registration on behalf of the MN, and the MAG simulates a home link to advertise a Home Network Prefix (HNP) to the MN. In this way, the MN is made to think itself always located on the home link, so that the MN does not need to support mobility management.

As shown in FIG. 2, the general process of allocating an HNP by the PMIPv6 system includes the following steps:

S101, the MN attaches to the network where the MAG is located. S102, the MAG sends a first access request for the MN to the AAA server. S103, the AAA server returns a first access response to the MAG, where the access response includes service configuration information of the MN, that is, service information (including service type and Service QoS and authorization information (key materials allocated to the MN). S104, the MAG on behalf of the MN, sends a registration message (that is, a Proxy Binding Update (PBU) message) to the LMA. S105, the LMA sends a second access request for the MN to the AAA server. S106, the AAA server returns a second access response. S105 and S106 are optional. S107, the LMA allocates an HNP to the MN according to the received PBU, creates a Binding Cache Entry (BCE) regarding the HNP and a Proxy Care-of Address (PCoA) (generally referred to as the IP address of the MAG), where the BCE includes a mapping relationship between the MN ID, the HNP, and the PCoA, and acts as a proxy of the MN to send a neighbor advertisement in which the link layer address corresponding to the HNP that is allocated to the MN is asserted to be the link layer address of the LMA. S108, the LMA returns a Proxy Binding Acknowledge (PBA) message, which carries the HNP information allocated to the MN, to the MAG S109, the MAG stores the HNP information, and sends a Router Advertisement (RA), which carries the HNP, to the MN. S110, after the MN receives the RA, the MN generates a home address according to the HNP.

In the preceding basic mechanism of PMIPv6, the HNP that the LMA allocates to the MN is exclusive. That is, the LMA allocates a unique HNP to each MN, and any two MNs do not have the same HNP. Furthermore, if multiple interfaces (IFs) of an MN are attached to the network through different access technologies and are connected to the LMA, the LMA allocates different HNPs to multiple IFs of the MN.

A shared prefix is in contrast to an exclusive prefix. An HNP is used by multiple MNs, or by multiple IFs of an MN. However, the conventional PMIPv6 and MN do not support the shared prefix.

As an intelligent MN is more capable of supporting multiple IFs (that is, each IF may be attached to the network through different access technologies), the multi-IF enabled MN has more requirements for some service applications. For example, services of the multi-IF enabled MN need to be attached to the network via multiple IFs of the MN to obtain more bandwidths, or services of the multi-IF enabled MN need to be handed over between different IFs to ensure load balancing. If the same prefix (that is, the shared prefix) is used by two or more IFs of the MN, the continuity of services/sessions in such requirements can be guaranteed.

During the implementation of the present disclosure, the inventor discovers at least the following problems in the prior art:

Because the multi-IF enabled MN has multiple IFs, the conventional system cannot determine which IFs need to be allocated with a shared prefix after being attached to the network. In addition, because an IF of the MN can have one or more prefixes, the conventional system cannot determine which prefix is shared with other IFs. Therefore, the problem about how to allocate a shared prefix to the multi-IF enabled MN should be solved as soon as possible.

SUMMARY

Embodiments of the present disclosure provide a prefix allocation method, a network system, and an LMA to solve the problem that a shared prefix cannot be allocated to a multi-IF enabled MN.

A prefix allocation method includes: receiving a registration request for a second IF of an MN from an MAG; according to the registration request, obtaining a first HNP that is already allocated to a first IF of the MN; and allocating the first HNP shared with the first IF to the second IF.

A network system includes: an MAG, configured to send a registration request for a second IF of an MN to an LMA; and the LMA, configured, according to the registration request sent from the MAG, to obtain a first HNP that is already allocated to a first IF of the MN, and allocate the first HNP shared with the first IF to the second IF.

An LMA includes: a receiving module, configured to receive a registration request for a second IF of an MN from an MAG; a prefix obtaining module, configured, according to the registration request received by the receiving module, to obtain a first HNP that is already allocated to a first IF of the MN; and an allocating module, configured to allocate the first HNP shared with the first IF and obtained by the prefix obtaining module to the second IF.

In embodiments of the present disclosure, an LMA receives a registration request for a second IF of an MN from an MAG and according to the registration request, the LMA obtains a first HNP that is already allocated to a first IF of the MN, and allocates the first HNP to the second IF of the MN. With the embodiments of the present disclosure, a shared prefix is allocated to the multi-IF enabled MN, and the multi-IF enabled MN can obtain more bandwidths for a same service that has the shared prefix or a service can be handed over between IFs that have the shared prefix, thus ensuring the load balancing and continuity of services/sessions.

BRIEF DESCRIPTION OF THE DRAWINGS

To make the present disclosure or the prior art clearer, the accompanying drawings for illustrating the embodiments of the present disclosure or the prior art are briefly described. Apparently, the accompanying drawings are merely exemplary, and those skilled in the art can derive other drawings from such accompanying drawings without creative efforts.

FIG. 5b is a schematic diagram of an extended Internet Control Message Protocol (ICMP) mobile prefix request according to an embodiment of the present disclosure;

FIG. 6 is a schematic diagram of a prefix information option according to an embodiment of the present disclosure;

DETAILED DESCRIPTION OF THE EMBODIMENTS

To make the objective, features, and merits of the present disclosure clearer and understandable, the embodiments of the present disclosure are described in detail with the accompanying drawing.

The method provided in embodiments of the present disclosure is based on the fact that a first HNP (HNP1) is already allocated to a first interface (IF1) of an MN. The process of allocating the HNP1 to the IF1 is the same as the process of allocating an HNP by the PMIPv6 system in the conventional art.

Figure 1:
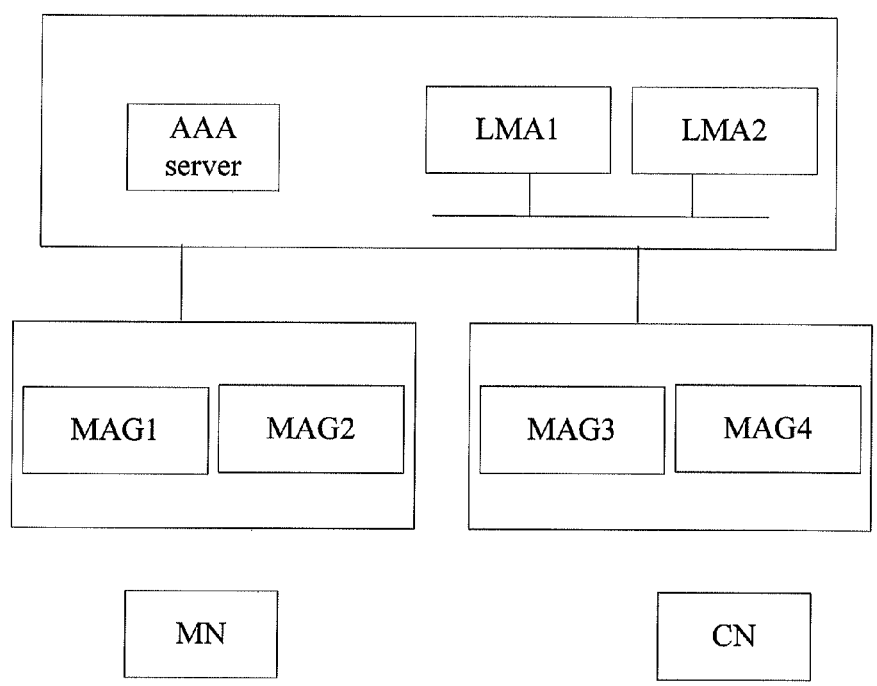
FIG. 1 is a schematic architecture diagram of a PMIPv6 system in the prior art.
Figure 2:
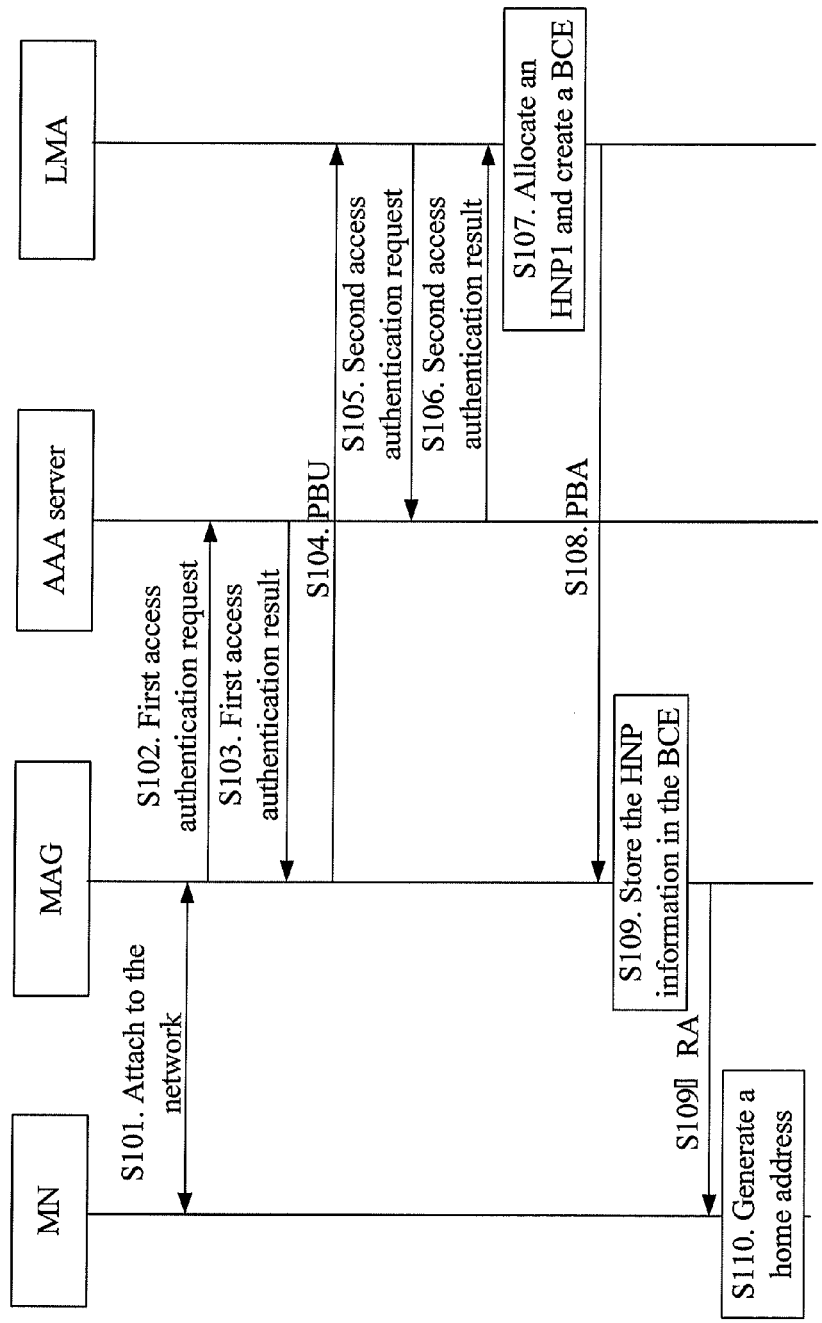
FIG. 2 is a signaling flowchart of allocating an HNP by the PMIPv6 system in the prior art.
Figures 3, 4, 5A:
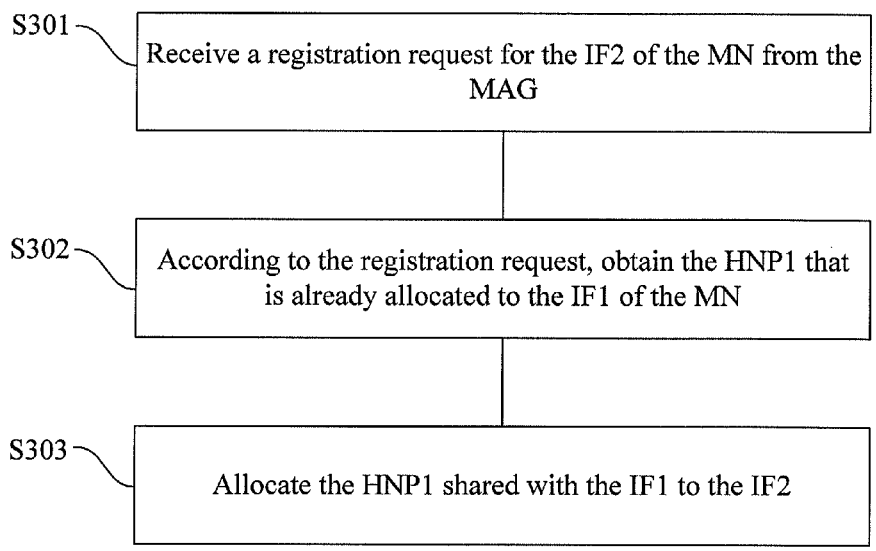
FIG. 3 is a schematic flowchart of a prefix allocation method according to an embodiment of the present disclosure.
FIG. 4 is a schematic diagram of an extended HNP option according to an embodiment of the present disclosure.
FIG. 5a is a schematic diagram of an extended Router Solicitation (RS) message according to an embodiment of the present disclosure.

A prefix allocation method is provided in a first embodiment of the present disclosure. As shown in FIG. 3, after a second interface (IF2) of the MN attaches to a network where a MAG is located, the method includes the following steps:

S301 Receive a registration request for the IF2 of the MN from the MAG

After the IF2 of the MN attaches to the network where the MAG is located, the MAG sends a registration request to the LMA on behalf of the IF2.

The (initial) registration request that the MAG sends to a LMA in this embodiment refers to a PBU message. The PBU message may include an MN ID (for example, the network access identifier (NAI)), PCoA bound to the requested prefix, and other information data (for example, the access technology type of the IF2 of the MN). The PBU message may further include information data such as whether the MN supports the shared prefix and a service type associated with the IF2. In this embodiment, an S flag bit, which indicates that the shared prefix is supported, is added to an extended HNP option (as shown in FIG. 4) to indicate the request for the shared prefix. Optionally, the obtained HNP1 information data is included; if such information data is not included, the prefix length is 0. Further, indication information data, which indicates that the MN supports the shared prefix, is added to an extended registration message to indicate whether the MN supports the shared prefix model.

S302 According to the registration request, obtain the HNP1 that is already allocated to the IF1 of the MN.

In this embodiment, the LMA may obtain the HNP1 in the following two modes:

In the first mode, the registration request that the LMA receives from the MAG carries information data for helping obtain the HNP1.

In the second mode, the registration request that the LMA receives from the MAG does not carry information data for helping obtain the HNP1.

In the first mode, the method, provided in the embodiment of the present disclosure, provides three types of information data for helping obtain the HNP1 in the registration request. The registration request carries the HNP1, or a prefix list that includes at least the HNP1, or a service type associated with the IF2.

In this case, the scenarios that the LMA obtains the HNP1 are specifically included as follows:

(1) When the registration request carries the HNP1, the LMA obtains the HNP1 from the registration request.

The HNP1 carried in the registration request comes from a data link layer message or a network layer message that is sent by the MN via the IF2 and received by the MAG.

(i) An L3 message that the MN sends to the MAG via the IF2 carries the HNP1 information data. Specifically, the L3 message is a new L3 message extended on the basis of an existing L3 message or a newly defined L3 message.

Preferably, the L3 includes an extended option to carry the HNP1. The L3 message may include an RS message or an ICMP mobile prefix request message.

The following describes the method by extending the existing RS and the ICMP mobile prefix request, as shown in FIG. 5a and FIG. 5b:

An S flag bit is added to the RS or the ICMP message, and is used to indicate a request for a shared prefix. The extended message may include a prefix information option, that is, the HNP1 that is already allocated to the IF1 of the MN in this embodiment. The prefix information option specifically includes the following contents (as shown in FIG. 6): type of the prefix information option, option length, prefix length, on-link flag L, automatic configuration flag A, optional route address flag R, reserved bit 1, valid life cycle, preferred life cycle, reserved bit 2, and prefix.

Optionally, the L3 message that the multi-IF enabled MN sends to the MAG further carries an option of service type associated with the IF2, where the option is used to carry the service type associated with the IF2.

In this embodiment, the process of the sending, by the MN, an L3 message to the MAG to request a shared prefix may be implemented independently. That is, in some scenarios, an IF of the MN may actively request a known HNP or IP address.

(ii) The link layer L2 message that the MN sends to an access point such as a Base Station (BS) via the IF2 carries the HNP1 information. The access point sends the HNP1 information to the MAG.

Preferably, the L2 message includes an extended option to carry the HNP1.

On the WiMAX access network based on the 802.16/802.16e wireless technology, preferably, the L2 message may include a request/acknowledgement message of an initial traffic flow or pre-configuration traffic flow.

Optionally, the L2 message that the multi-IF enabled MN sends to the MAG further carries a flag bit that indicates that the IF2 supports the shared prefix, indicating that the MN is capable of supporting the shared prefix.

Optionally, the L2 message that the multi-IF enabled MN sends to the MAG further carries an option of service type associated with the IF2, where the option is used to carry the service type associated with the IF2.

(2) When the registration request carries a prefix list that includes at least the HNP1, the LMA matches the prefix list with prefixes in the locally stored binding entry of the MN, and obtains the same HNP1.

In this embodiment, the local refers to the LMA.

Preferably, when only one prefix is available in the prefix list of the IF2 that the MAG extracts from the service configuration information of the IF2, that is, only the HNP1 is included in the prefix list, the LMA may directly obtain the HNP1 after receiving a registration request that carries only the HNP1, and does not need to perform the matching.

In this embodiment, one service type uses one prefix (a shared prefix) of one or more IFs.

Conventionally, the service configuration information is stored on the AAA server, and includes service information and authorization information related to the subscription of users and the operator. The service information includes service type and service QoS, and the authorization information includes a key allocated to the MN and a charging index. The Remote Authentication Dial in User Service (RADIUS) or the Diameter protocol may be used between the MAG and the AAA server. If the RADIUS protocol is used, the first access response should be an Access Accept message, and the first access request should be a RADIUS Accept Request message.

On the basis of the conventional art, the service configuration information, in this embodiment, further includes IF information corresponding to the service information. The IF information includes a prefix list corresponding to the IF, and a mapping relationship between services and prefixes in the prefix list. Preferably, the service configuration information further includes indication information indicating whether the MN supports the shared prefix.

When the IF2 of the MN attaches to the network, in the process of initiating, by the MAG the first authentication to the AAA server, the MAG receives from the AAA server a first access response that carries the service configuration information of the MN or the IF2. Optionally, the service configuration information further includes information about whether the MN supports the shared prefix.

The prefix list is extracted by the MAG from the first access response returned by the AAA server, where the first access response carries the service configuration information of the MN or the IF2. When the first access request that the MAG sends to the AAA server carries an MN ID, the first access response returned by the AAA server carries the service configuration information of the MN. When the first access request that the MAG sends to the AAA server carries the MN ID and the IF2 ID, the first access response returned by the AAA server carries only the service configuration information of the IF2.

In the actual deployment, the LMA performs a first authentication process and/or a second authentication to obtain the service configuration information of the MN.

The prefix information list is a prefix list that extracted from the service configuration information of the MN carried in the first access response that the MAG receives from the AAA server.

After receiving the registration request, the LMA matches the prefix information list with the service type carried by the IF2, so as to obtain the HNP1 that corresponds to the same service type.

Preferably, after the MAG receives the HNP1 allocated by the LMA, the MAG sends a request (on the basis of the Diameter or RADIUS protocol) to the AAA server, and sends information, which the IF2 is served by the MAG to the AAA server.

(3) When the registration request carries the service type associated with the IF2, the LMA matches the service type associated with the IF2 with a service type in the binding entry, stored locally, of the MN, and obtains the HNP1 corresponding to a same service type.

When the registration request carries the service type associated with the IF2, the LMA obtains the HNP1 by matching the same service type in the binding entry, stored on the LMA, of the MN with the service type associated with the IF2. The binding entry may include an MN identity, an HNP of an IF, and service type corresponding to the HNP.

The service type associated with the IF2 of the MN in the registration request may come from the first access response that the AAA server returns to the MAG; where the first access response carries the service configuration information of the IF2, and the MAG extracts the service type associated with the IF2 from the service configuration information. Alternatively, the service type may come from an link layer L2 message or an network layer L3 message that the MN sends to the MAG, and the link layer L2 message or the network layer L3 message carries the service type associated with the IF2 in an extended option.

For the second mode, the method provided in this embodiment provides two approaches for the LMA to obtain the HNP1.

(4) The LMA extracts the service type associated with the IF2 from the second access response returned by the AAA server, where the second access response carries the service configuration information of the MN or the IF2. The LMA matches the service type associated with the IF2 with a service type in the binding entry, stored locally, of the MN, and obtains the HNP1 corresponding to the same service type.

According to the MN ID or the IF2 ID carried in the registration request, the LMA sends a second access request, which carries an MN ID or carries an MN ID and an IF2 ID, to the AAA server.

The service configuration information, compared with the conventional art, further includes IF information corresponding to the service information, where the IF information includes a prefix list corresponding to the IF. If the first access request includes an IF identity of the MN, the service configuration information corresponding to the IF of the MN is returned; if the first access request does not include the IF identity of the MN, all the service configuration information of the MN is returned. Preferably, the service configuration information further includes indication information indicating whether the MN supports the shared prefix.

Preferably, in this obtaining mode, after the LMA allocates the HNP1 to the IF2, the LMA sends information that the IF2 of the MN is served by the LMA to the AAA server.

(5) The LMA extracts a prefix list that includes at least the HNP1 from the second access response returned by the AAA server, where the second access response carries the service configuration information of the MN or the IF2. Then, the LMA matches the prefix list with prefixes in the binding entry, stored locally, of the MN, and obtains the same HNP1.

Preferably, when only one prefix is available in the prefix list of the IF2 that the LMA extracts from the service configuration information of the IF2, that is, only the HNP1 is included in the prefix list, the LMA may directly obtain the HNP1 according to a shared prefix indication, and does not need to perform the matching.

S303 Allocate the HNP1 shared with the IF1 to the IF2.

After the LMA obtains the HNP1, the LMA allocates the HNP1 shared with the IF1 to the IF2.

In this embodiment, the allocation process is as follows: the LMA creates a binding entry for the IF2, and stores, in a binding entry, the HNP1, a lifetime of the HNP1, service information corresponding to the HNP1, and information about whether the shared prefix is supported. The MN ID, IF information (for example, the IF identity, the access type, and other IF related information) of the MN, and the PCoA are also stored in the binding entry.

Preferably, before the LMA allocates the HNP1 to the IF2, the LMA determines, according to the indication information that indicates whether the MN supports the shared prefix and is carried in the registration request, whether the MN supports the shared prefix; if the MN supports the shared prefix, the LMA allocates the HNP1 to the IF2.

The indication information, which indicates th at the MN supports the shared prefix and is carried in the registration request, includes:

indication information that indicates that the MN supports the shared prefix and is extracted by the MAG from an L2 message or an L3 message that the MN sends via the IF2, where the L2 message or the L3 message carries the indication information, which indicates that the MN supports the shared prefix, in an extended flag bit; or indication information that indicates that the MN supports the shared prefix and is extracted by the MAG from a first access response returned by the AAA server, where the first access response carries service configuration information.

Preferably, before the LMA allocates the HNP1 to the IF2, the LMA may determine whether the service type associated with the IF2 is the same as the service type corresponding to the HNP1; if the service type associated with the IF2 is the same as the service type corresponding to the HNP1, the LMA allocates the HNP1 to the IF2.

In this embodiment, when multiple prefixes are already allocated to one or more IFs and another IF requests the shared prefix, the prefix list of the new IF carried in the service configuration information returned by the AAA server may include multiple prefixes same as those of other IFs. When the LMA receives the prefix list and matches the prefix list with the binding entry, stored on the LMA, of the MN, the LMA obtains one or multiple shared prefixes. The LMA allocates these shared prefixes to the new IF to achieve the objective of allocating shared prefixes to a multi-IF enabled MN. Preferably, before allocating these shared prefixes to the new IF, the LMA determines whether the MN supports the shared prefix, and/or matches the service type associated with the new IF with a locally stored service type associated with other IFs of the MN, so as to determine which shared prefixes should be allocated to the new IF.

Figure 7:
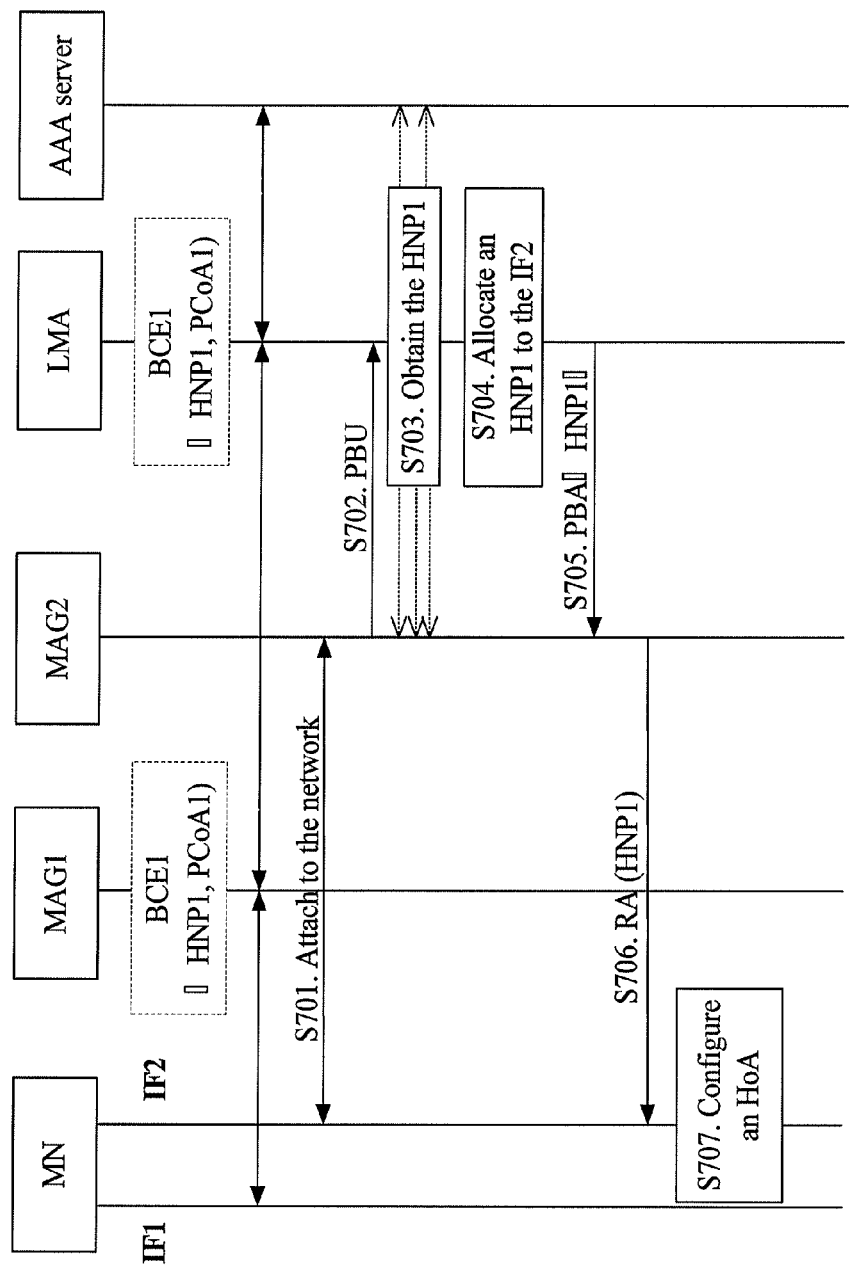
FIG. 7 is a signaling flowchart of a prefix allocation method according to an embodiment of the present disclosure.

As shown in FIG. 7, the method provided in an embodiment of the present disclosure includes the following steps:

In step S701, the IF2 of the MN attaches to a network where the MAG2 is located.

In step S702, the MAG2 sends a registration request to the LMA.

The (initial) registration request that the MAG2 sends to the LMA may include an MN ID (for example, the NAI), PCoA bound to the requested prefix, and other information (for example, the access technology type of the IF2 of the MN). The registration request may further include the HNP1 requested by the IF2, or a prefix list that includes at least the HNP1, or the service type associated with the IF2, and include indication information that indicates whether the MN supports the shared prefix.

In step S703, the LMA obtains the HNP1 that is already allocated to the IF1.

The LMA may obtain the HNP1 that is already allocated to the IF1 in the following modes:

When the registration request carries the HNP1, the LMA obtains the HNP1 from the registration request, where the HNP1 carried in the registration request comes from the L2 message or L3 message that the MN sends to the MAG via the IF2.

Alternatively, when the registration request carries a prefix list that includes at least the HNP1, the LMA matches the prefix list with prefixes in the binding entry, stored on the LMA, of the MN, and obtains the same HNP1, where the prefix list is extracted by the MAG from the first access response which is returned by the AAA server and carries the service configuration information of the MN or the IF2.

Alternatively, when the registration request carries the service type associated with the IF2, The LMA matches the service type associated with the IF2 with a service type in the binding entry, stored on the LMA, of the MN, and obtains the HNP1 corresponding to the same service type.

Alternatively, the LMA extracts the service type, carried by the IF2, from the second access response returned by the AAA server, where the second access response carries the service configuration information of the MN or the IF2, matches the service type associated with the IF2 with a service type in the binding entry, stored on the LMA, of the MN, and obtains the HNP1 corresponding to the same service type.

In step S704, the LMA allocates the HNP1 to the IF2 of the MN.

Preferably, before the LMA allocates the HNP1 to the IF2 of the MN, the LMA determines whether the MN supports the shared prefix. If the MN supports the shared prefix, then step S704 is performed.

Preferably, before the LMA allocates the HNP1 to the IF2 of the MN, the LMA may determine whether the service type associated with the IF2 is the same as the service type corresponding to the HNP1. If the service type associated with the IF2 is the same as the service type corresponding to the HNP1, then step S704 is performed.

Whether the MN supports the shared prefix is determined according to the indication information that indicates that the MN supports the shared prefix and is carried in the registration request. The indication information, which indicates that the MN supports the shared prefix and carried in the registration information, may include:

indication information that indicates that the MN supports the shared prefix and is carried in the L2 message or the L3 message that the MN sends via the IF2; or indication information that indicates that the MN supports the shared prefix and is extracted by the MAG from the first access response returned by the AAA server, where the first access response carries the service configuration information.

Preferably, after the LMA allocates the HNP1 to the IF2, the LMA sends information that the IF2 is served by the LMA to the AAA server.

In addition, when the MN does not support the shared prefix or when the service type associated with the IF2 is different from the service type corresponding to the HNP1, the LMA allocates a new home network prefix, HNP2, to the IF2 of the MN or generates a failure code indicating that the shared prefix is not allowed to use.

Preferably, the method further includes S705, that is, the LMA carries the HNP1 allocated to the IF2 in a registration response, and returns the registration response to the MAG2.

In this embodiment, the registration response returned by the LMA refers to a PBA message. After the MAG2 receives the registration response, the MAG2 creates a second BCE (BCE2) for the IF2, where the BCE2 may include a mapping relationship between the MN ID, the IF2 ID, and the PCoA2, and a corresponding LMA.

Preferably, the method further includes S706, that is, the MAG2 returns the HNP1 to the MN.

If the LMA allocates the HNP1 to the IF2, the MAG2 returns the HNP1 to the MN through an RA after receiving, from the LMA, a registration response that includes the HNP1.

Optionally, the extended RA message carries a shared prefix flag bit.

Preferably, the method further includes S707, that is, the MN configures a home address, which is same as that of the IF1, for the IF2.

The IF2 of the MN performs IP address configuration according to the shared prefix to carry out the subsequent service handover or service use.

The IP address that the MN configures for the IF2 is the same as or different from the IP address configured for the IF1. If the IP address of the IF2 is the same as that of the IF1, the MN may directly request the IP address when obtaining the HNP1.

Through the method provided in this embodiment, after receiving a registration request for the IF2 of the MN, the LMA obtains an HNP1 that is already allocated to the IF1 of the MN, and allocates the HNP1 to the IF2. With the method provided in this embodiment, a shared prefix is allocated to the multi-IF enabled MN, and the multi-IF enabled MN can obtain more bandwidths for a same service that has the shared prefix; or a service can be handed over between IFs that have the shared prefix, thus ensuring the load balancing and continuity of services/sessions.

Figure 8:
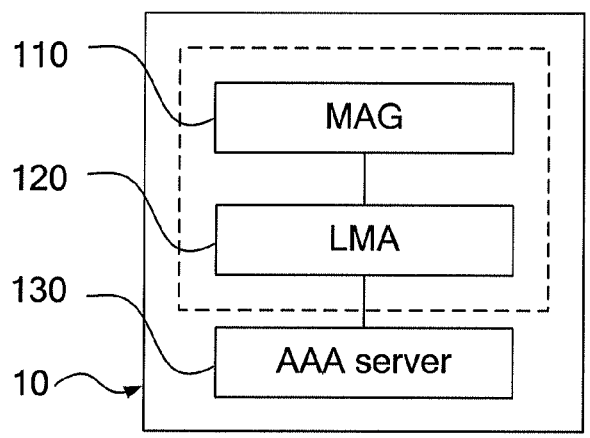
FIG. 8 is a structure diagram of a network system according to an embodiment of the present disclosure.

An embodiment of the present disclosure provides a network system. As shown in FIG. 8, the network system includes an MAG 110 and an LMA 120.

A MAG 110 is configured to send a registration request for an IF2 of a MN to a LMA 120.

The LMA 120 is configured, according to the registration request sent from the MAG 110, to obtain an HNP1 that is already allocated to an IF1 of the MN, and allocate the HNP1 shared with the IF1 to the IF2.

Preferably, the MAG 110 is further configured to obtain an HNP1, or a prefix list that includes at least the HNP1, or a service type associated with the IF2, and carry the HNP1, the prefix list, or the service type associated with the IF2 in the registration request.

Preferably, the step of obtaining the HNP1 that is already allocated to the IF1 of the MN is as follows: when the registration request carries the HNP1, the LMA 120 obtains the HNP1 from the registration request; or when the registration request carries a prefix list that includes at least the HNP1, the LMA 120 matches the prefix list with the prefixes in the binding entry, stored on the LMA 120, of the MN, and obtains the same HNP1; or when the registration request carries a service type associated with the IF2, the LMA 120 matches the service type associated with the IF2 with a service type in the binding entry, stored on the LMA 120, of the MN, and obtains the HNP1 corresponding to the same service type.

Preferably, the step of obtaining the HNP1 that is already allocated to the IF1 of the MN is as follows: the LMA 120 extracts the service type associated with the IF2 from a second access response returned by a AAA server, where the second access response carries the service configuration information of the MN or the IF2, matches the service type associated with the IF2 with a service type in the binding entry, stored on the LMA 120, of the MN, and obtains the HNP1 corresponding to the same service type.

Preferably, the step of obtaining the HNP1 that is already allocated to the IF1 of the MN is as follows: the LMA 120 extracts a prefix list that includes at least the HNP1 from a second access response returned by the AAA server, where the second access response carries the service configuration information of the MN or the IF2, matches the prefix list with prefixes in the binding entry, stored on the LMA 120, of the MN, and obtains the same HNP1.

Preferably, the MAG 110 is further configured to obtain indication information that the MN supports the shared prefix, and carry, in the registration request, the indication information that the MN supports the shared prefix.

Preferably, the LMA 120 is further configured to determine whether the MN supports the shared prefix according to the indication information, which indicates that the MN supports the shared prefix and is carried in the registration request sent from the MAG 110, before allocating the HNP1 to the IF2.

Preferably, the network system 10 further includes: an AAA server 130 configured to: perform first access authentication on the MAG 110 and return a first access response; perform second access authentication on the LMA 120 and return a second access response; and store the service configuration information of the MN.

In this embodiment, when the network system receives a registration request for the IF2 of the MN, the network system obtains an HNP1, which is allocated to the IF1 of the MN, through the LMA, and allocates the HNP1 to the IF2. The network system provided in this embodiment allocates a shared prefix to a multi-IF enabled MN, and the multi-IF enabled MN can obtain more bandwidths for a same service that has the shared prefix; or a service can be handed over between IFs that have the shared prefix, thus ensuring the load balancing and continuity of services/sessions.

Figure 9:
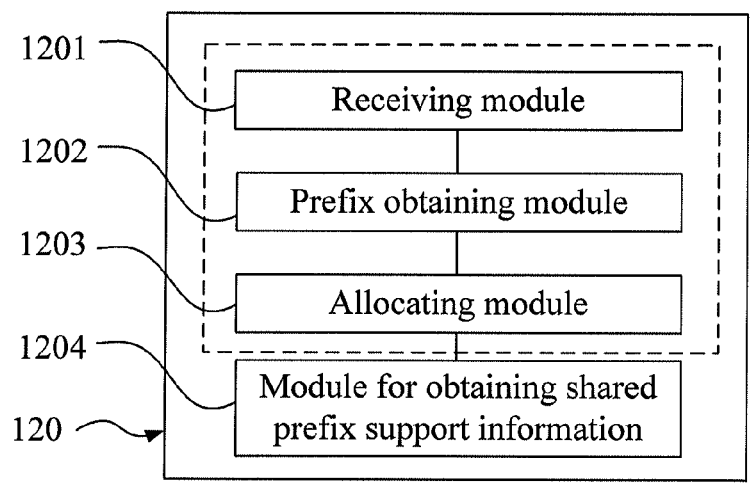
FIG. 9 is a structure diagram of an LMA according to an embodiment of the present disclosure.

An embodiment of the present disclosure provides an LMA. As shown in FIG. 9, the LMA includes:

a receiving module 1201, configured to receive a registration request for the IF2 of the MN from the MAG;

a prefix obtaining module 1202, configured, according to the registration request received by the receiving module 1201, to obtain an HNP1 that is already allocated to the IF1 of the MN; and an allocating module 1203, configured to allocate the HNP1, which is shared with the IF1 and is obtained by the prefix obtaining module 1202, to the IF2.

Preferably, the prefix obtaining module 1202 includes one or any combination of the following units:

a first unit, configured to obtain the HNP1 from the registration request when the registration request carries the HNP1;

a second unit, configured to: when the registration request carries a prefix list that includes at least the HNP1, match the prefix list with prefixes in the binding entry, stored on the LMA 120, of the MN, and obtain the same HNP1;

a third unit, configured to: when the registration request carries the service type associated with the IF2, match the service type associated with the IF2 with a service type in the binding entry, stored on the LMA 120, of the MN, and obtain the HNP1 corresponding to the same service type;

a fourth unit, configured to: extract the service type, carried by the IF2, from a second access response returned by the AAA server, where the second access response carries the service configuration information of the MN or the IF2, match the service type associated with the IF2 with a service type in the binding entry, stored on the LMA 120, of the MN, and obtain the HNP1 corresponding to the same service type;

a fifth unit, configured to: extract a prefix list that includes at least the HNP1 from a second access response returned by the AAA server, where the second access response carries the service configuration information of the MN or the IF2, match the prefix list with prefixes in the binding entry, stored on the LMA 120, of the MN, and obtain the same HNP1.

Preferably, the LMA 120 further includes:

a module 1204 for obtaining information that shared prefix is supported, configured to obtain indication information that indicates that the MN supports the shared prefix and is carried in the registration request; and the allocating module 1203, further configured to determine whether the MN supports the shared prefix according to indication information that indicates that the MN supports the shared prefix and is carried in the registration request.

In this embodiment, after the LMA receives a registration request for the IF2 of the MN, the LMA obtains an HNP1 that is already allocated to the IF1 of the MN, and allocates the HNP1 to the IF2, thus allocating a shared prefix to a multi-IF enabled MN.

Figure 10:
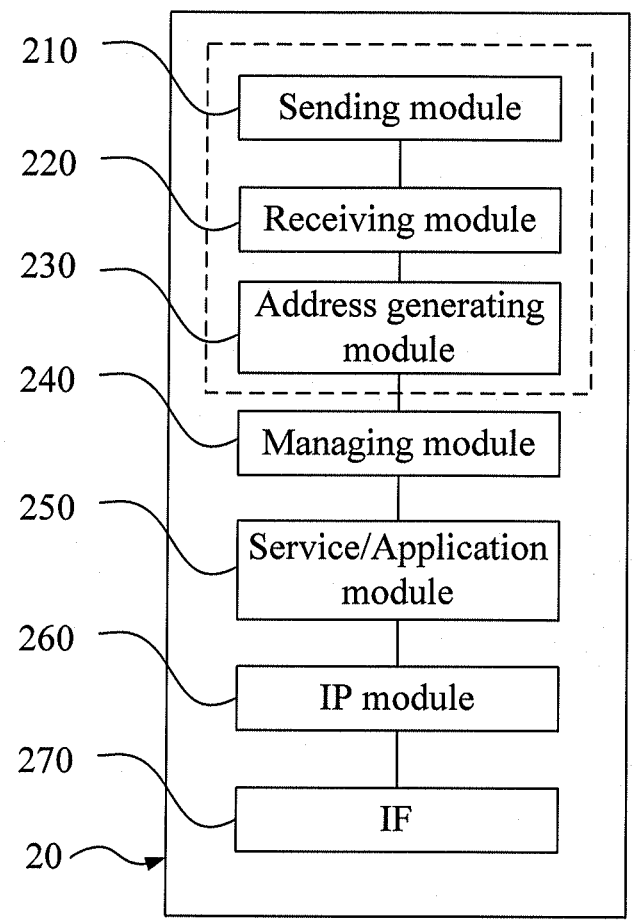
FIG. 10 is a structure diagram of a multi-IF enabled MN according to an embodiment of the present disclosure.

An embodiment of the present disclosure provides a multi-IF enabled MN. As shown in FIG. 10, the multi-IF enabled MN includes a sending module 210, a receiving module 220, and an address generating module 230.

The sending module 210 is configured to send an L2 message or an L3 message that carries an HNP1 to the MAG via the IF2 after the HNP1 is already allocated to the IF1 of the MN and the IF2 of the MN attaches to the network where the MAG is located.

The receiving module 220 is configured to receive an HNP returned by the MAG.

The address generating module 230 is configured to generate a home address according to the HNP received by the receiving module 220.

Preferably, the MN 20 further includes a managing module 240 configured to: manage the request, sent by the sending module 210, for a shared prefix of the IF, manage a shared home address generated by the address generating module 230 according to the shared prefix, and control the service handover between multiple IFs that have the shared home address.

Preferably, the MN 20 further includes a service/application module 250, an IP module 260, and an IF 270.

The service/application module 250 is configured to provide users with services/applications.

The IP module 260 is configured to provide the services/applications of the service/application module 250 with functions such as TCP/IP or UDP/IP.

The IF 270 is configured to connect to same/different access networks through the IP module 260.

Figure 11:
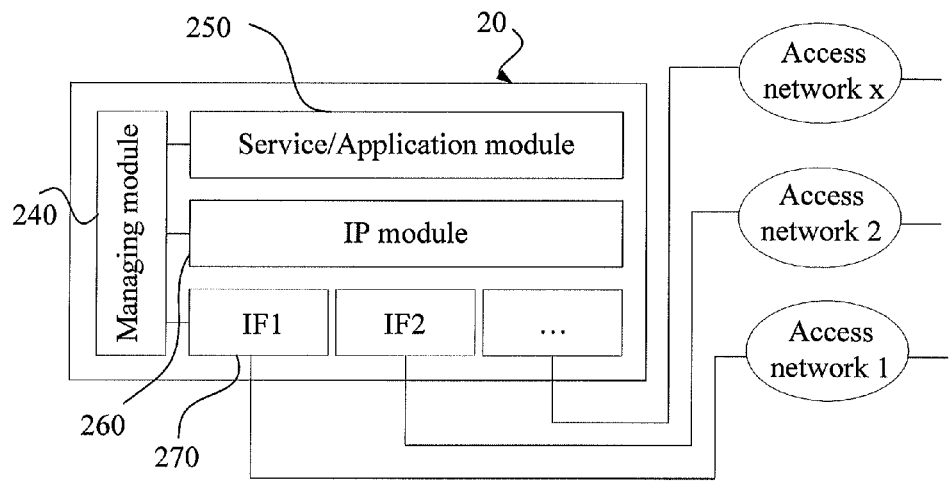
FIG. 11 is a schematic diagram of a relationship between a managing module, a service/application module, an Internet Protocol (IP) module, and an IF on a multi-IF enabled MN according to an embodiment of the present disclosure.

The relationship between the managing module 240, the service/application module 250, the IP module 260, and the IF 270 is shown in FIG. 11. The managing module 240, according to the policy information, determines whether the service is connected to the network at the same time via multiple IFs 270, or hands over the service from one IF 270 to another IF 270, or performs other operations. In addition, the managing module determines whether the IF 270 needs to allocate the shared prefix to another IF 270.

The policy information refers to the policy information between the service/application module 250 and the IF 270 managed by the managing module 240. The policy information may include: QoS needed by the service and the QoS of the link (the bandwidths and delays obtained via the 3G IF are different from the bandwidths and delays obtained via the Wireless Fidelity (WiFi) IF) corresponding to the IF 270, and service expenses and expenses (for example, expenses of the same service may vary with interfaces adopted, e.g., via the 3G IF and the WiFi IF) caused by the link corresponding to the IF 270. Alternatively, the policy information refers to the status information of the IF 270 managed and/or sensed by the managing module 240. For example, when an IF 270 is overloaded or the IF 270 is disconnected (for example, the MN moves outside the network coverage), the managing module 240 can hand over the services/applications from an IF 270 to another IF 270.

In this embodiment, the multi-IF enabled MN manages the request for and use of the IF prefix; after the network obtains the HNP that is already allocated to an IF of the MN, and allocates the HNP to another IF subsequently attached, the MN may generate a shared home address according to the shared prefix, and the service of the multi-IF enabled MN may be connected to the network, via multiple IFs of the MN, to obtain more bandwidths; and the service of the multi-IF enabled MN may be handed over between different IFs, thus guaranteeing the load balancing and continuity of services/sessions.

Figure 12:
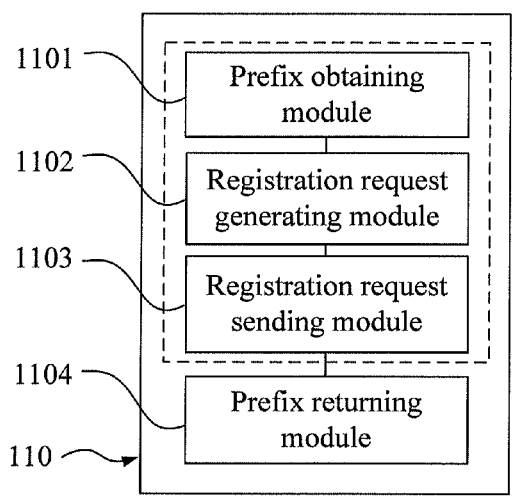
FIG. 12 is a structure diagram of an MAG according to an embodiment of the present disclosure.

An embodiment of the present disclosure provides an MAG As shown in FIG. 12, the MAG includes a prefix obtaining module 1101, a registration request generating module 1102, a registration request sending module 1103, and a prefix returning module 1104.

The prefix obtaining module 1101 is configured to obtain the HNP1 after the HNP1 is allocated to the IF1 of the MN and the IF2 of the MN attaches to the network where the MAG 110 is located.

The registration request generating module 1102 is configured to generate the registration request that carries the HNP1 obtained by the prefix obtaining module 1101.

The registration request sending module 1103 is configured to send the registration request to the LMA.

Preferably, the prefix obtaining module 1101 includes a first obtaining unit configured to obtain the HNP1 from the registration request when the registration request carries the HNP1, where the HNP1 carried in the registration request comes from an L2 message or an L3 message that the MN sends to the MAG 110 via the IF2.

Preferably, the prefix obtaining module 1101 includes a second obtaining unit configured to: when the registration request carries a prefix list that includes at least the HNP1, match the prefix list with prefixes in the binding entry, stored on the LMA, of the MN, and obtain the same HNP1, where the prefix list is extracted by the MAG from a first access response which is returned by the AAA server and includes the service configuration information data of the MN or the IF2.

Preferably, the prefix obtaining module 1101 includes a third obtaining unit configured to: when the registration request carries the service type associated with the IF2, match the service type associated with the IF2 with a service type in the binding entry, stored on the LMA, of the MN, and obtain the HNP1 corresponding to the same service type.

Preferably, the MAG 110 further includes a prefix returning module 1104 configured to return the HNP that the LMA allocates to the IF2 to the MN.

In this embodiment, after the IF2 of the MN attaches to the network where the MAG is located, the MAG obtains the HNP1 that is already allocated to the IF1 of the MN, and sends a registration request that carries the HNP1 to the LMA; after an HNP is allocated to the IF2 of the MN, the MAG returns the HNP to the MN, thus allocating a shared prefix to a multi-IF enabled MN.

The method, network system, and LMA provided in embodiments of the present disclosure are also applicable for a scenario where multiple prefixes are already allocated to one or more IFs (for example, IF1) of the MN, or where multiple prefixes shared with other IFs are allocated to a new IF (for example, the IF2).

The embodiments of the network system, the LMA, the multi-IF enabled MN, and the MAG according to the present disclosure are described briefly because of similar contents with the embodiments of the proxy allocation method mentioned above. For details, please refer to the description of method embodiments provided in the present disclosure.

It is understandable to those skilled in the art that all or some of the steps of the method are completed by hardware instructed by a program. The program may be stored in a computer readable storage medium. When the program is executed, the process includes: receiving a registration request for the IF2 of the MN from the MAG; according to the registration request, obtaining an HNP1 that is already allocated to the IF1 of the MN; and allocating the HNP1 shared with the IF1 to the IF2. The storage medium may be a Read Only Memory or Random Access Memory (ROM/RAM), a magnetic disk, or a Compact Disk-Read Only Memory (CD-ROM).

The above descriptions are merely exemplary embodiments of the present disclosure, but not intended to limit the protection scope of the present disclosure. Any modification, equivalent replacement, or improvement made without departing from the spirit and principle of the present disclosure should fall within the protection scope of the present disclosure.

What is claimed is:

1. A prefix allocation method, comprising:
  receiving by a Local Mobility Anchor (LMA), a registration request for a second interface of a multiple interfaces enabled Mobile Node (MN) from a Mobile Access Gateway (MAG), the registration request comprises an MN ID, a Proxy Care-of Address (PCoA) bound to a requested prefix and a first service type associated with the second interface, wherein the first service type comprises an access technology type of the second interface of the multiple interfaces enabled MN;
  obtaining by the LMA, a first Home Network Prefix that is already allocated to a first interface of the multiple interfaces enabled MN, wherein the LMA stores multiple binding entries, one of the multiple binding entries comprises the first home network prefix and a second service type, and the second service type comprises the same access technology type as the access technology type in the first service type, the LMA obtaining the first home network prefix comprises searching the multiple binding entries for the binding entry comprises the second service type, and obtaining the first home network prefix in the searched out binding entry; and
  allocating by the LMA, the first home network prefix to the second interface as the requested prefix;
  wherein,
  the multiple interfaces enabled MN supports the shared prefix model, and the service of the multiple interfaces enabled MN is connected to the network, via the first interface and the second interface of the MN concurrently, to obtain more bandwidths.

2. The method of claim 1, wherein before allocating the first home network prefix to the second interface, the method further comprising:
  determining whether the multiple interfaces enabled MN supports a shared prefix according to indication information that indicates that the MN supports the shared prefix, wherein the indication information is carried in the registration request.

3. The method of claim 2, wherein the indication information that indicates that the multiple interfaces enabled MN supports the shared prefix is extracted by the MAG from the first access response, wherein the indication information which is returned by the AAA server comprises service configuration information.

4. A network system, comprising:
  a Mobile Access Gateway (MAG), configured to send a registration request for a second interface (interface) of a multiple interfaces enabled Mobile Node (MN) to a Local Mobility Anchor, obtain a first service type associated with the second interface, wherein the first service type comprises an access technology type of the second interface of the multiple interfaces enabled MN, and carry an MN ID, a Proxy Care-of Address (PCoA) bound to a requested prefix and the first service type associated with the second interface in the registration request, wherein the MAG is configured to obtain a first Home Network Prefix that is already allocated to a first interface of the of the multiple interfaces enabled MN as the requested prefix; and
  a Local Mobility Anchor, configured to obtain the first Home Network Prefix that is already allocated to the first interface of the multiple interfaces enabled MN, wherein the LMA stores multiple binding entries, one of the multiple binding entries comprises the first home network prefix and a second service type, and the second service type comprises the same access technology type as the access technology type in the first service type, the LMA obtaining the first home network prefix comprises searching the multiple binding entries for the binding entry comprises the second service type, and obtaining the first home network prefix in the searched out binding entry;
  wherein,
  the multiple interfaces enabled MN supports the shared prefix model, and the service of the multiple interfaces enabled MN is connected to the network, via the first interface and the second interface of the MN concurrently, to obtain more bandwidths.

5. The network system of claim 4, wherein:

the MAG is further configured to obtain indication information that the multiple interfaces enabled MN supports the shared prefix, and carry the indication information in the registration request; and the Local Mobility Anchor is further configured to determine when the multiple interfaces enabled MN supports the shared prefix according to the indication information that indicates that the multiple interfaces enabled MN supports the shared prefix and is carried in the registration request sent from the MAO before allocating the first home network prefix to the second interface.

* * * * *